Aug. 12, 1952    B. J. BODNAR    2,606,530
BALL TIP FOUNTAIN PEN
Filed Sept. 20, 1946
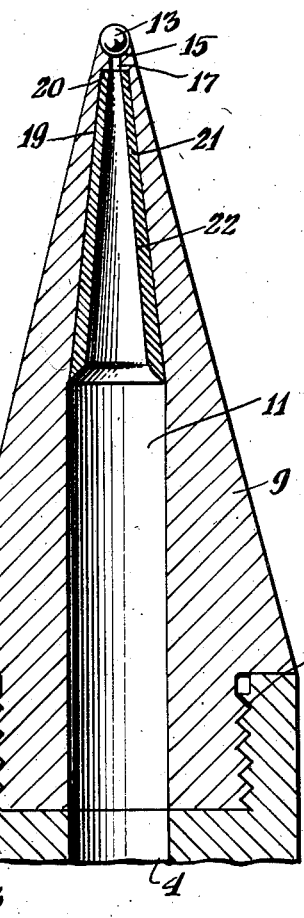
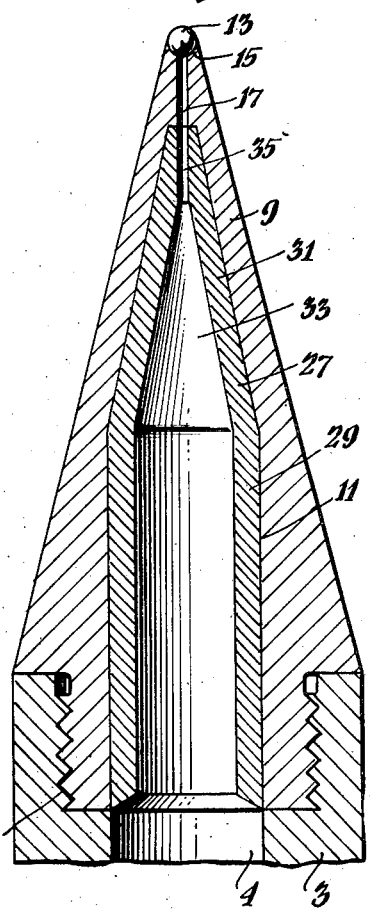
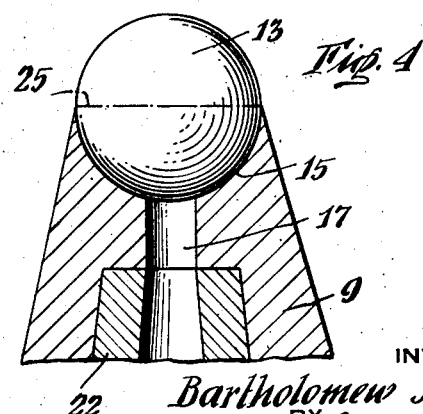
INVENTOR
Bartholomew J. Bodnar
BY
George H. Corey
ATTORNEY Patented Aug. 12, 1952

2,606,530

UNITED STATES PATENT OFFICE 2,606,530

BALL TIP FOUNTAIN PEN

Bartholomew J. Bodnar, Tuckahoe, N. Y.

Application September 20, 1946, Serial No. 698,213

3 Claims. (Cl. 120—42.4)

This invention relates to writing and marking instruments and more particularly to instruments of this type which are provided with a rotatable marking element or writing ball for contact with the surface to be marked or written upon. The invention has particular utility in fountain pens constructed with a reservoir for the ink and having a rotatable writing ball at the point or writing end of the pen.

It is an object of the invention to provide a marking instrument having a marking or writing ball which is exposed for contact with the paper or surface to be marked throughout at least the full hemispherical surface thereof.

It is another object of the invention to provide in a writing or marking instrument a novel means for retaining a writing or marking ball in the socket of the instrument without interfering with the ability of the instrument to apply a marking to a surface when the instrument is held in any of a wide range of angular positions with respect to the writing surface.

It is a further object of the invention to provide a writing or marking instrument having a ball-receiving socket preformed with surfaces to which the spherical surface of the ball may fit and which does not require deformation or alteration of the material of the socket after insertion of the ball in order to retain the ball in the socket.

The invention will be described for simplicity in connection with a fountain pen having a reservoir internally thereof and provided with a tip or member at the writing end of the pen which provides a socket for a ball rotatable therein. Preferably the socket provides a surface of spherical form conforming substantially to a portion of the sphere of the ball. If desired or necessary in a particular construction of the pen means may be provided, such as chambers or recesses relieving the spherical surface of the socket, to assist in carrying the ink to the ball surface and for distributing it thereover.

It is an important feature of the invention that the ball is retained in the socket by magnetic means and in bearing relation to the socket surface. The ball is made of magnetic material capable of being attracted by a permanent magnet or other means providing a magnetic field. This magnet is carried by the fountain pen in juxtaposition to the tip, preferably internally of the pen or its casing. The magnet is so formed and is so placed in the pen that a pole thereof is positioned adjacent the socket, that is, adjacent the ball therein so that the ball is drawn into the socket and bears against the surface thereof. No portion of the socket means or tip, therefore, is required to extend beyond the diametral section of the ball which is perpendicular to the axis of the pen, that is, which is parallel to the circle of the outer edge of the annular socket surface.

In order to prevent the ball from coming directly in contact with the magnet, that is, the metal of a permanent magnet preferably utilized for the purposes of the invention, the member or tip in which the socket is formed is made of non-magnetic material such for example as Phosphor bronze. This construction prevents the ball "sticking" to the magnet as it would if it came in contact with the magnetic pole. Such a non-magnetic interposed material is not influenced by the magnetic force which is effective to draw the ball toward the magnet but only in bearing contact with the non-magnetic material. The ball, therefore, may rotate in the socket without "sticking."

The invention will be more fully understood from the following description of the drawings, in which:

Fig. 1 shows a fountain pen or ink pencil having a tip provided with magnetic means for retaining the ball;

Fig. 2 is a section on line 2—2 of Fig. 1;

Fig. 3 shows in section a modification of the tip and magnetic retaining means of the invention;

Fig. 4 shows in section to enlarged scale the end of a tip, the socket and the ball retained therein.

In Fig. 1 the fountain pen 1 is provided with a barrel 3 of tubular form defining a reservoir 4 for the ink. The barrel 3 may be provided with a cap 5 suitably fitted thereto which is removable for access to the reservoir for filling thereof. Details of the construction of the barrel, the reservoir and the cap form no part of the present invention and these parts may be constructed in a conventional manner or in various ways as proposed heretofore in the art to provide a fountain pen or other writing instrument suitable for any particular purpose.

Screwed to the end of the barrel 3 having a shouldered and threaded bore 7 is a conical tip 9 making a tight joint with the barrel to prevent leakage of the ink flowing from the reservoir 4. As shown in Fig. 2 the conical tip 9 is formed with a bore 11 concentric with and of the same size as that of the reservoir 4 for conveying the ink from the reservoir toward the ball 13 set in a socket 15 formed with a spherical surface adjacent the apex of the cone or tip 9. The tip 9 adjacent the socket 15 is provided with a restricted passage 17 of relatively small diameter but sufficient readily to convey the ink to the ball 13 set in the socket 15 to replace the ink carried therefrom by the ball as it rotates in the socket 15 upon contact with the paper. The conical tip 9 is made of non-magnetic material and the spherical surface 15 in the particular embodiment shown in Fig. 2 is of approximately the same diameter as that of the ball with sufficient tolerance to permit the ball easily to rotate and to carry the ink between the spherical surface 15 and the spherical surface of the ball.

Concentric with the bore 11 the tip 9 in the embodiment shown in Fig. 2 is formed with a tapered bore 19 extending from the bore 11 to a shoulder 20 adjacent the socket 15. Fitted in the bore 19 is a magnetic member 21 of conical tubular form. The smaller end of the magnetic member 21 is formed to fit against the shoulder 20 and the conical bore 22 of the magnetic member leads from the bore 11 of the tip 9 for flow of the ink therethrough to the passage 17. The conical bore 22 is tapered in the embodiment of Fig. 2 substantially to the diameter of the passage 17. The ink, therefore, may flow freely from the reservoir 4 of the fountain pen to the ball 13.

The ball 13 is made of magnetic material having a substantial permeability. The magnetic member 21 is magnetized to provide a pole at each end of the length thereof. This magnetic member preferably is made of steel magnetized so as to be a permanent magnet. The magnetic member 21, therefore, exerts a continuous magnetic attraction on the ball 13 and draws the ball 13 against the surface of the socket 15. A sufficient portion of the non-magnetic material of the tip 9, however, lies between the ball of the magnet 21 and the ball so that the ball does not "stick" to the magnet but is capable of rotating in bearing relation on the surface 15, always being held against the surface by the attraction of the magnet. As hereinabove indicated the cross-section of steel in the magnet, the proximity of the ball thereof to the surface 15 and the degree of magnetization of the magnet may be such, having regard to the magnetic permeability of the ball and of the material of the tip 9 intervening between the pole of the magnet and the ball, that while the ball is always retained in the socket against mechanical displacement ink may be carried between the ball 13 and the spherical surface 15 of the socket contacted by the ball to carry the ink to the outer surface of the ball for application to the paper as the ball is rolled upon the paper.

In Fig. 3 is shown a pen tip fitted with a magnetic member 27 having a cylindrical tubular portion 29 and a conical tapered portion 31. The cylindrical portion 29 is fitted to the bore 11 of the tip and extends substantially to the reservoir 4 in the barrel 3. The conical portion 31 of the magnetic member 27 is provided with a conical bore 33 leading to a restricted passage 35 which is in line with and of the same diameter as the passage 17 which enters the socket 15 in which the ball 13 is set. There is thus provided in the embodiment of Fig. 3 a magnetic element having a greater mass than the form shown in Fig. 2 which is adapted for some purposes to secure a greater attraction of the ball. The pole of the magnetic member 27 which is adjacent the ball thus may be somewhat more removed from the ball, the passage 17 formed in the tip being of correspondingly greater length. The embodiment of Fig. 3 thus provides for greater mechanical strength adjacent the apex of the tip while securing the requisite magnetic attraction for the ball.

Within the scope of the invention various modifications may be made of the shape and size of the tip and the magnetic element supported therein, as well as of the size of the ball or other rotatable marking element and the socket in which it is set. The surface of the socket 15, while shown in the embodiments illustrated in the drawings as a spherical surface conforming substantially to that of the sphere of the ball 13, may be of other forms and may provide less extent of contact with the ball than shown in these figures. In general, however, the contact is made with an annular surface adjacent the outer edge of the socket which conforms to the spherical surface of the ball or provides at least a tangential contact therewith, thus to secure sealing of the ink against outward flow until the ball is rotated in the socket. Upon such rotation of the ball by virtue of the capillary action due to surface tension of the ink the ink will be carried between the annular contact surface and the ball to the outside surface thereof.

Although in Figs. 2 and 3 the tip 9 is shown with the socket surface 15 forming a sharp edge with the cone surface of the tip, this edge may have a substantial thickness without unduly interfering with the use of the pen at a relatively acute angle to the writing surface.

Although the invention has been more particularly shown and described as embodying an arrangement in which at least half of the surface of the rotatable element projects beyond the confines of the socket, it will be understood that the invention is not limited to such a disposition. It may, for example, prove advantageous to utilize the magnetic principle in conjunction with a retaining means extending outwardly slightly beyond the hemispherical diameter of the ball. In this association the magnet will insure more positive sealing against leakage even though the retaining means provides for more clearance between its inner bearing surfaces and the ball than have heretofore been considered practical.

The tip 9 may be made of any suitable metal or of other materials which are non-magnetic or are of low magnetic permeability. Although the ball may be made of a permeable material such as soft iron, in order that it shall not tend to become permanently magnetized, the ball preferably is made of steel which may be hardened so as to provide for resisting wear in the rotation of the ball in contact with the paper and with the socket surface.

It will also be understood that the invention is equally applicable to a pen or writing instrument whereof the rotatable marking element is cylindrical in shape.

Other modifications of the materials used and of the dimensions and arrangements of the parts may be made within the scope of the invention to provide a writing instrument having the features above described and intended to be covered by the appended claims.

I claim:

1. In a fountain pen of the type having a freely rotatable writing ball mounted in a seat at one end of a barrel enclosing an ink reservoir which is in communication at one end with the seat, a terminal portion for said barrel composed of non-magnetic material and having outer side walls converging toward a point, a seat for said ball at the converging end of said terminal portion, said seat being substantially hemi-spherical in shape with the outer peripheral edge thereof merging with the converging side walls of said terminal portion to form a sharp peripheral rim portion which extends approximately to but not beyond the center of said ball when the latter is seated, whereby any of the surface portions of said ball extending outwardly from said peripheral rim portion may be brought into writing relation to a writing surface at any of a wide range of angles of inclination of said pen to the writing surface, a ball composed of magnetic material positioned on said seat, and permanent magnet means supported on the barrel in spaced relation to said ball but sufficiently close to induce a magnetic flux in said ball to maintain it in seated position on said seat while permitting said ball to be rotated freely as the pen is moved across a writing surface with the ball in contact therewith.

2. In a fountain pen, a ball point formed of magnetic material, a substantially conical tip of non-magnetic material having at its apex a concave substantially hemispherical seat for said ball point, said seat having its periphery merging with the converging exterior surface of the tip to form a sharp peripheral rim which extends approximately to but not beyond the center of the ball point when the latter is seated, said tip having an ink passage extending therethrough in fluid communication with said seat and a shoulder in said passage facing away from said seat, and spaced a short distance therefrom and a permanent magnet in said tip engaging said shoulder and effective to induce a magnetic flux in said ball point so as to retain it in its seat while permitting it to rotate freely as it is moved across a writing surface, said magnet having an ink passage therethrough registering with the ink passage in said tip.

3. In a fountain pen, a ball point formed of magnetic material, means of non-magnetic material forming a completely non-magnetic seat for said ball point, said non-magnetic means including a substantially conical tip having at its apex an opening for receiving said ball point, and a permanent magnet having one end within said tip and spaced from said ball point, but sufficiently close thereto to hold it on the seat, while permitting it to rotate freely as it is moved across a writing surface, said tip and said magnet having communicating passages therethrough to convey ink to said ball point.

BARTHOLOMEW J. BODNAR.

REFERENCES CITED

The following references are of record in the file of this patent:

UNITED STATES PATENTS

| Number | Name | Date |
| --- | --- | --- |
| 2,386,500 | Parker | Oct. 9, 1945 |
| 2,390,636 | Biro | Dec. 11, 1945 |
| 2,428,960 | Cloutier | Oct. 14, 1947 |

FOREIGN PATENTS

| Number | Country | Date |
| --- | --- | --- |
| 5,567 | Great Britain | 1884 |